United States Patent

Walz et al.

[15] 3,640,677
[45] Feb. 8, 1972

[54] PROCESS FOR DYEING FIBRE MATERIALS OF POLYACRYLONITRILE OF ACRYLONITRILE-CONTAINING COPOLYMERS

[72] Inventors: Klaus Walz, Leverkusen-Wiesdorf; Walter Hees, Koeln-Hoehenhaus; Mathieu Quaedvlieg, Opladen, all of Germany

[73] Assignee: Farbenfabriken Bayer Aktiengesellschaft, Leverkusen, Germany

[22] Filed: Jan. 28, 1969

[21] Appl. No.: 794,804

[30] Foreign Application Priority Data

Feb. 9, 1968 Germany ................. F 54782

[52] U.S. Cl. .......................................... 8/172, 8/177 AB
[51] Int. Cl. ............................................ D06p 3/70
[58] Field of Search .......................... 8/84, 172, 177 AB

[56] References Cited

UNITED STATES PATENTS

| 3,529,920 | 9/1970 | Walz et al. | 8/177 AB |
|---|---|---|---|
| 2,183,754 | 12/1939 | Schlack | 8/172 X |
| 2,607,803 | 8/1952 | Lecher et al. | 8/84 X |

FOREIGN PATENTS OR APPLICATIONS

| 634,304 | 12/1963 | Belgium | 8/172 |
|---|---|---|---|
| 1,205,528 | 11/1965 | Germany | 8/84 |

Primary Examiner—George F. Lesmes
Assistant Examiner—T. J. Herbert, Jr.
Attorney—Plumley, Tyner & Sandt

[57] ABSTRACT

Process for dyeing textile fiber materials of polyacrylonitrile or copolymers of acrylonitrile with cationic dyestuffs which comprises carrying out the dyeing in the presence of amidinium compounds of the formula

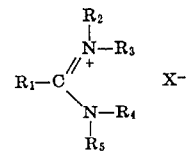

where $R_1$, $R_2$, $R_3$, $R_4$ and $R_5$ are, independently of one another, hydrogen, an optionally substituted alkyl, cycloakyl, aralkyl or aryl group; $R_2$ may form with $R_1$ or $R_3$ and/or $R_4$ with $R_5$ a heterocyclic ring, and $X^-$ is an anion.

2 Claims, No Drawings

PROCESS FOR DYEING FIBRE MATERIALS OF POLYACRYLONITRILE OF ACRYLONITRILE-CONTAINING COPOLYMERS

The present invention relates to a process for dyeing fiber materials produced from polyacrylonitrile or acrylonitrile-containing copolymers with cationic dyestuffs; more particularly it concerns a process wherein the dyeing is carried out in the presence of amidinium compounds of the formula

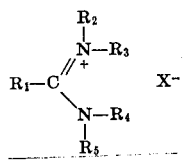

in which $R_1$, $R_2$, $R_3$, $R_4$ and $R_5$ stand, independently of one another, for hydrogen, for an optionally substituted alkyl, cycloalkyl, aralkyl or aryl group; $R_2$ may form with $R_1$ or $R_3$ and/or $R_4$ with $R_5$ a heterocyclic ring, and $X^-$ is an anion.

Alkyl groups are particularly those which contain one to 12 carbon atoms, for example, the methyl, ethyl, propyl, isopropyl, butyl, hexyl, octyl, decyl and the dodecyl group; cycloalkyl groups are particularly the cyclohexyl, tetrahydronaphthalene and decahydronaphthalene radical; aralkyl groups are particularly the benzyl- and phenylethyl radical; aryl groups are particularly the phenyl and naphthyl radical.

As substitutents for the alkyl groups there may be mentioned in particular the hydroxyl group, the phenoxy, chlorophenoxy and dichloro-phenoxy radical; for the cycloalkyl, aralkyl and aryl radicals primarily lower alkyl groups, e.g., the methyl and ethyl group, as well as halogen atoms, e.g., the chloro or bromo atom, may be used.

As anion $X^-$ there may be mention, in particular, $Cl^-$, $Br^-$, $SO_4^{--}$, $NO_3^-$, $HCOO^-$, $CH_3COO^-$, $CH_3SO_4^-$ and

The compounds to be used according to the invention can be produced by various known methods, for example, by reacting imino ether hydrochlorides with ammonia or amines, or by reacting said amide-acid chloride or acid amide-dialkyl sulphate complexes with ammonia or amines [cf. Houben-Weyl "Methoden der organischen Chemie," vol. VIII (1952) pages 702 et seq., as well as German Published Pat. No. 1,205,528].

Examples of the amidinium compounds to be used for the process according to the invention are the compounds of the formula (I) in which $R_1$–$R_5$ and X have the following meaning:

| $R_1$ | $R_2$ | $R_3$ | $R_4$ | $R_5$ | X |
|---|---|---|---|---|---|
| H | $CH_3-$ | $CH_3-$ | $nC_4H_9-$ | $nC_4H_9-$ | $CH_3OSO_3^-$ |
| H | $CH_3-$ | $CH_3-$ | H | 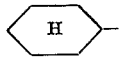 | $CH_3OSO_3^-$ |
| H | $CH_3-$ | $CH_3-$ | H | $nC_{10}H_{21}-$ | $CH_3OSO_3^-$ |
| H | $CH_3-$ | $CH_3-$ | H | $nC_{12}H_{25}-$ | $CH_3OSO_3^-$ |
| H | $CH_3-$ | $CH_3-$ | H | 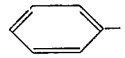 | $CH_3OSO_3^-$ |
| H | $CH_3-$ | $CH_3-$ | $CH_3-$ |  | $Cl^-$ |
| H | $CH_3-$ | $CH_3-$ | H | 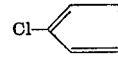 | $Cl^-$ |
| H | $CH_3-$ | $CH_3-$ | H | 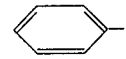 | $Cl^-$ |
| H | $CH_3-$ | $CH_3-$ | H |  | $Cl^-$ |
| H | $CH_3-$ | $CH_3-$ | H | 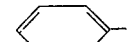 | $CH_3OSO_3^-$ |
| H | H |  | H | 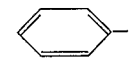 | $Cl^-$ |

| $R_1$ | $R_2$ | $R_3$ | $R_4$ | $R_5$ | X |
|---|---|---|---|---|---|
| H | $C_2H_5-$ | $C_2H_5-$ | H | $nC_6H_{13}-$ | $CH_3OSO_3^-$ |
| H | $C_2H_5-$ | $C_2H_5-$ | H | $nC_4H_9-$ | $CH_3OSO_3^-$ |
| H | $C_2H_5-$ | $C_2H_5-$ | H | $nC_8H_{17}-$ | $CH_3OSO_3^-$ |
| H |  | H | H | 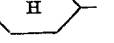 | $CH_3OSO_3^-$ |
| H | 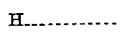 | H | H | $nC_4H_9-$ | 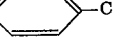 |
| H | $C_2H_5-$ | $C_2H_5-$ | H | 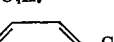 | $CH_3OSO_3^-$ |
| $CH_3-$ | $CH_3-$ | $CH_3-$ | $nC_4H_9-$ | $nC_4H_9-$ | $CH_3OSO_3^-$ |
| $CH_3-$ | $CH_3-$ | $CH_3-$ | H | 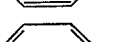 | $CH_3OSO_3^-$ |
| $CH_3-$ | $CH_3-$ | $CH_3-$ | H | 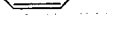 | $CH_3OSO_3^-$ |

| $R_1$ | $R_2$ | $R_3$ | $R_4$ | $R_5$ | X |
|---|---|---|---|---|---|
| $CH_3-$ | $C_2H_5-$ | H | H | ⟨Ph⟩H | $Cl^-$ |
| $CH_3-$ | ⟨Ph⟩H | H H | $HOCH_2CH_2-$ | $HOCH_2CH_2-$ | $CH_3OSO_3^-$ |
| $nC_3H_7-$ | $CH_3-$ | $CH_3-$ | H | ⟨Ph⟩H | $CH_3OSO_3^-$ |
| $nC_3H_7-$ | $CH_3-$ | $CH_3-$ | $C_2H_5-$ | $HOCH(CH_3)-CH_2-$ | $CH_3OSO_3^-$ |
| ⟨Ph⟩ | H | H | H | H | $CH_3COO-$ |
| ⟨Ph⟩ | H | H | $CH_3-$ | $CH_3-$ | $Cl^-$ |
| ⟨Ph⟩$-CH_2-$ | H | H | $CH_3-$ | $CH_3-$ | $Br^-$ |
| ⟨Ph⟩$-CH_2-$ | $C_2H_5-$ | H | $C_2H_5-$ | H | $Cl^-$ |
| ⟨Ph⟩$-CH_2-$ | $nC_4H_9-$ | H | H | H | $Cl^-$ |
| $nC_7H_{15}-$ | H | H | $CH_3-$ | $CH_3-$ | $NO_3^-$ |

Further suitable compounds of the formula (I) are the following, for example:

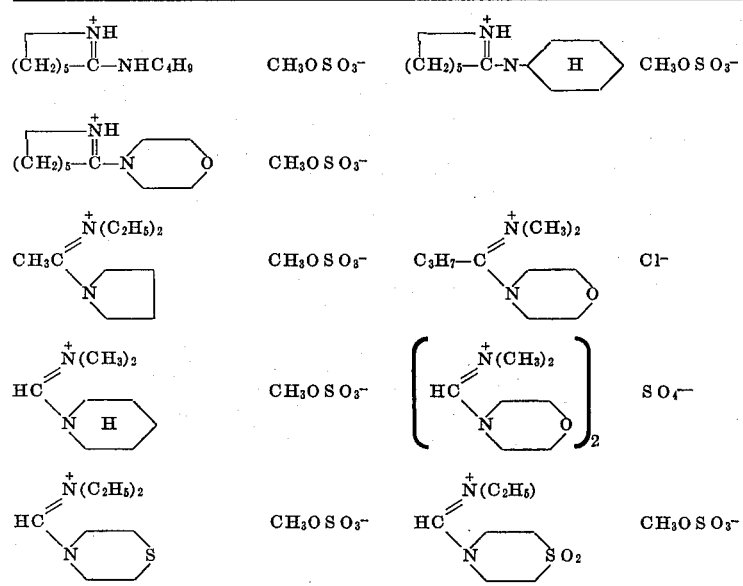

Cationic dyestuffs which may be used are dyestuffs of very diverse compound classes, for example, diphenylmethane, triphenylmethane and rhodamine dyestuffs, omnium group-containing azo and anthraquinone dyestuffs, furthermore thiazine, oxazine, methine and azomethine dyestuffs as are described, for example, in "American Dyestuff Reporter" (1954), pages 432–433, in the U.S. Pat. No. 2,716,655 and in the British Pat. Nos. 785,988, 871,624, 791,932, 930,471.

The necessary quantities of the amidinium compounds of the formula (I) to be used according to the invention can readily be determined by preliminary experiments. In general, these compounds are used in amounts of about 1.5–3 percent, referred to the weight of the dyeing material used.

Suitable acrylonitrile-containing copolymers are, for example, those containing vinyl chloride, vinylidene chloride, vinyl acetate, vinyl chloroacetate, vinyl alcohol, acrylic and methacrylic acid, acrylic and methacrylic acid esters, allylchloroacetate, or basic vinyl compounds, such as vinyl imidazole, vinyl benzimidazole, vinyl pyridine, vinyl methyl pyridine, vinyl pyrimidine, provided the proportion of these comonomers in the copolymer does not exceed 20 percent by weight.

The dyeing of the polyacrylonitrile fiber materials can be carried out in conventional manner by introducing the material to be dyed into an aqueous bath heated to about 50°–60° C. and containing the cationic dyestuff, amidinium compounds of the formula (I), additives of salts, such as sodium acetate or sodium sulphate, furthermore acids, such as acetic acid or formic acid, subsequently raising the temperature of the dyebath to approximately 100° C. in the course of about 30 minutes and then keeping the dyebath at this temperature until the bath is exhausted. Alternatively, it is also possible to add subsequently the cationic dyestuff to the dyebath, for example, when the temperature of the bath has risen to about 60° C. It is also possible to pretreat the dyeing material at a temperature of about 40°–100° C. with a liquor which contains the customary salts and acids as well as the amidinium compounds of the formula (I), but no dyestuff, then to add the dyestuff and to carry out the dyeing process at 100° C. Finally, it is also possible to introduce the dyeing material immediately into the dyebath heated to approximately 100° C. and containing the amidinium compounds of the formula (I). The amidinium compounds can also be used in combination with basic compounds, as have previously been used as levelling auxiliary agents for the dyeing of polyacrylonitrile fibers, for example, with quaternary ammonium salts containing higher alkyl radicals, such as cetylbenzyl-dimethyl-ammonium chloride.

With the aid of the process according to the invention it is possible to dye fiber materials of the greatest variety consisting of polyacrylonitrile or acrylonitrile-containing copolymers or containing polymers or copolymers of this type, for example, spun-sheathed cables, combed materials, flocks, yarns, woven or knitted fabrics, with outstanding levelness and in deep shades.

The amidinium compounds to be used according to the invention improve the migration of the cationic dyestuffs in the fiber, even without the concurrent use of electrolytes, such as sodium sulphate, without reducing affinity of the fibers for the cationic dyestuffs in a degree worth mentioning.

EXAMPLE 1

Yarns of polyacrylonitrile fibers are introduced, in a goods-to-liquor ratio 1:40, into a bath heated to 80° C. and containing, per litre, 0.2 g. of the dyestuff obtained by quaternising 1-methylamino-4-(3'-dimethylamino-propylamino)-anthraquinone with dimethyl sulphate, 0.25 g. sodium acetate, 0.3 g. glacial acetic acid and 0.6 g. of the compound of the formula

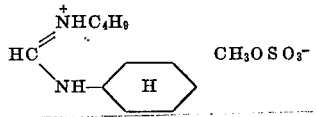

The bath is then heated to 98° C. and kept at this temperature for 60 minutes. A blue dyeing of excellent levelness is obtained.

Instead of the N-butyl-N'-cyclohexyl-formamidinium-methosulphate used, the same good result was obtained with the use of one of the following amidinium compounds:

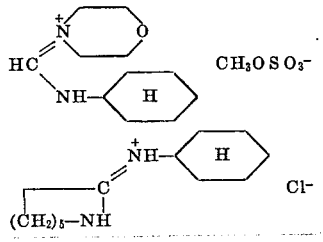

EXAMPLE 2

Yarns of polyacrylonitrile fibers are introduced, in a goods-to-liquor ratio 1:40, into a bath heated to 80° C. and containing, per litre, 0.1 g. of the dyestuff 1-amino-4-(dimethylamino-methylanilide)-anthraquinone hydrochloride, 0.25 g. sodium acetate, 0.3 g. glacial acetic acid and 0.7 g. of the compound of the formula

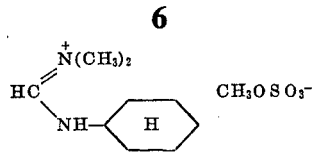

The bath is heated to 98° C. and kept at this temperature for 60 minutes. A level blue dyeing is obtained.

A blue dyeing of the same levelness was obtained by using, instead of the amidinium compound used above, the same amount of one of the following amidinium compounds:

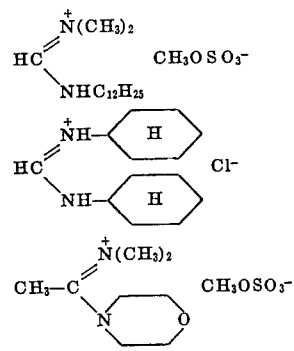

EXAMPLE 3

Yarns of polyacrylonitrile fibers are introduced, at a goods-to-liquor ratio 1:40, into a bath heated to 80° C. and containing, per litre, 0.15 g. of the dyestuff obtainable by quaternising 1-(3'4-(p-toluidine)-anthraquinone with dimethyl sulphate, 0.25 g. sodium acetate, 0.3 g. glacial acetic acid, 0.6 g. of the compound of the formula

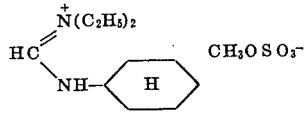

The bath is then heated to 98° C. and kept at this temperature for 60 minutes. A greenish blue dyeing of excellent levelness is obtained.

We claim:
1. Process for the dyeing of fiber materials produced from polyacrylonitrile or acrylonitrile-containing copolymers with cationic dyestuffs, characterized by carrying out the dyeing process in the presence of amidinium compounds of the formula

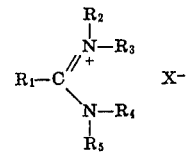

in which $R_1$, $R_2$, $R_3$, $R_4$ and $R_5$ stand, independently of one another, for hydrogen, for an optionally substituted alkyl, cycloakyl, aralkyl or aryl group; $R_2$ may form with $R_1$ or $R_3$ and/or $R_4$ with $R_5$ a heterocyclic ring, and $X^-$ is an anion.

2. Fiber materials of polyacrylonitrile or acrylonitrile-containing copolymers dyed according to claim 1.

* * * * *